United States Patent
Lee et al.

(10) Patent No.: US 11,425,040 B2
(45) Date of Patent: Aug. 23, 2022

(54) NETWORK SWITCHING DEVICE AND METHOD FOR PERFORMING MARKING USING THE SAME

(71) Applicant: Ulsan National Institute of Science and Technology, Ulsan (KR)

(72) Inventors: Kyunghan Lee, Ulsan (KR); Junseon Kim, Ulsan (KR)

(73) Assignee: ULSAN NATIONAL INSTITUTE OF SCIENCE AND TECHNOLOGY, Ulsan (KR)

( * ) Notice: Subject to any disclaimer, the term of this patent is extended or adjusted under 35 U.S.C. 154(b) by 0 days.

(21) Appl. No.: 16/666,766

(22) Filed: Oct. 29, 2019

(65) Prior Publication Data

US 2020/0162384 A1 May 21, 2020

(30) Foreign Application Priority Data

Nov. 20, 2018 (KR) .......................... 10-2018-0143742

(51) Int. Cl.
| | |
|---|---|
| *H04L 47/11* | (2022.01) |
| *H04L 47/10* | (2022.01) |
| *H04L 47/625* | (2022.01) |
| *H04L 43/0864* | (2022.01) |
| *H04L 47/2483* | (2022.01) |

(52) U.S. Cl.
CPC .......... *H04L 47/11* (2013.01); *H04L 43/0864* (2013.01); *H04L 47/18* (2013.01); *H04L 47/2483* (2013.01); *H04L 47/6255* (2013.01)

(58) Field of Classification Search
CPC . H04L 43/0864; H04L 47/18; H04L 47/6255; H04L 47/2483; H04L 47/11; H04L 47/283

See application file for complete search history.

(56) References Cited

U.S. PATENT DOCUMENTS

| | | | | |
|---|---|---|---|---|
| 7,298,699 B1 * | 11/2007 | Montuno | ................ | H04L 43/00 370/232 |
| 7,610,330 B1 * | 10/2009 | Quinn | .................... | H04L 45/02 709/201 |
| 2009/0213823 A1 * | 8/2009 | Liu | ........................ | H04W 24/02 370/338 |
| 2011/0205889 A1 * | 8/2011 | Chen | ....................... | H04L 47/10 370/230 |

(Continued)

FOREIGN PATENT DOCUMENTS

| | | |
|---|---|---|
| KR | 10-2008-0021491 A | 3/2008 |
| KR | 10-1093500 B1 | 12/2011 |
| KR | 10-2017-0015000 A | 2/2017 |

*Primary Examiner* — Mandish K Randhawa
(74) *Attorney, Agent, or Firm* — Maier & Maier, PLLC

(57) ABSTRACT

A network switching device includes: a communication unit; an information collection unit configured to obtain information on a network state of the network from first and second information for packets received through the communication unit; a marking reference calculation unit configured to calculate a marking reference based on the second information when it is determined that the network state has changed based on the first information; and a marking execution unit configured to perform marking indicating a congestion degree on at least a part of the packets received through the communication unit based on the calculated marking reference.

10 Claims, 5 Drawing Sheets

(56) References Cited

U.S. PATENT DOCUMENTS

| | | | |
|---|---|---|---|
| 2011/0205895 A1* | 8/2011 | Chen | H04L 47/193 370/231 |
| 2015/0271081 A1* | 9/2015 | Arumilli | H04L 47/25 370/235 |
| 2016/0072717 A1* | 3/2016 | Ansari | H04L 45/24 370/412 |
| 2016/0241484 A1* | 8/2016 | De Schepper | H04L 47/31 |
| 2018/0091431 A1* | 3/2018 | Burbridge | H04L 43/10 |

\* cited by examiner

NETWORK SWITCHING DEVICE AND METHOD FOR PERFORMING MARKING USING THE SAME

CROSS-REFERENCE TO RELATED APPLICATIONS

This application is based on and claims priority from Korean Patent Application No. 10-2018-0143742, filed on Nov. 20, 2018, the disclosure of which is incorporated herein in its entirety by reference for all purposes.

FIELD

The present disclosure relates to a network switching device and a method for performing marking using the same.

BACKGROUND

A network switching device such as a router or the like is provided between terminals to participate in packet transmission/reception performed therebetween. For example, a packet transmitted from a first terminal is delivered to a second terminal through the network switch device, and a packet transmitted from the second terminal is delivered to the first terminal through the network switching device.

In a process of transmitting/receiving the packets, the network switching device can insert marking into some of the packets. For example, if the first terminal transmits a packet to the second terminal, the first terminal can receive a response packet from the second terminal through the network switching device. Some of the packets received in this manner may contain marking inserted by the network switching device.

Here, "marking" is an index inserted into the packet and indicates a congestion degree of a network where the packet is transmitted/received.

The first terminal can control the transmission amount of the packet transmitted from the first terminal to the second terminal or to another terminal based on the marking.

SUMMARY

The above-described network switching device is required to ensure low-latency guarantee or high resource utilization.

In view of the above, the present disclosure provides a network switching device that ensures low-latency guarantee or high resource utilization by inserting marking into a packet while adaptively reflecting changes in network states or latency demand.

In accordance with an aspect, there is provided a network switching device to be connected to a network, comprising: a communication unit; an information collection unit configured to obtain information on a network state of the network from first and second information for packets received through the communication unit; a marking reference calculation unit configured to calculate a marking reference based on the second information when it is determined that the network state has changed based on the first information; and a marking execution unit configured to perform marking indicating a congestion degree of the network on at least a part of the packets received through the communication unit based on the calculated marking reference.

The marking reference calculation unit may determine that the network state has changed when the first information represents that a start packet or an end packet of a flow is included in the packets.

The second information may include at least one of latency demand required by a transmitter for transmitting a packet, baseline end-to-end round-trip time (RTT), the number of flows transmitted through an output port of the communication unit, and a link capacity of the output port.

The information collection unit may obtain a target queue length of the communication unit from the latency demand, and the marking reference calculation unit may calculate the marking reference based on the obtained target queue length as well as the second information received through the communication unit.

The marking reference calculation unit may calculate the marking reference such that a current queue length of the communication unit remains within a predetermined range from the obtained target queue length and without exceeding the obtained target queue length.

The marking reference calculation unit may calculate the marking reference using a TCP fluid model.

The marking execution unit may count the number of packets received through the communication unit, perform the marking on one of the counted packets when the counted number of packets is greater than or equal to the number of packets defined by the marking reference, and reset the counted number of packets.

The marking execution unit may perform the marking such that each distance between two adjacent packets on which the marking is performed becomes identical.

The marking execution unit may perform the marking on a flow basis.

Marking references applied to respective flows may have different values.

In accordance with another aspect, there is provided a method for performing marking using a network switching device to be connected to a network, the method comprising: obtaining information on a network state of the network from first information for packets received by the network switching device; determining whether or not the network state has changed based on the obtained information; calculating a marking reference based on second information for the packets when it is determined that the network state has changed; and allowing the network switching device to perform marking indicating a congestion degree of the network on at least a part of the packets based on the calculated marking reference.

In accordance with still another aspect, there is provided a computer-readable storage medium including executable instructions, wherein the instructions, when executed by a processor, cause the processor to perform a method for performing marking using a network switching device, the method comprising: obtaining information on a network state of the network from first information for packets received by the network switching device; determining whether or not the network state has changed based on the obtained information; calculating a marking reference based on second information for the packets when it is determined that the network state has changed; and allowing the network switching device to perform marking indicating a congestion degree of the network on at least a part of the packets based on the calculated marking reference.

In accordance with one embodiment, the marking reference can be calculated by immediately reflecting information on the network state or information such as latency demand received from a predetermined terminal. Therefore, in accordance with one embodiment, the marking can be performed based on the calculated marking reference, which makes it possible to ensure low-latency guarantee or high resource utilization.

BRIEF DESCRIPTION OF THE DRAWINGS

The objects and features of the present disclosure will become apparent from the following description of embodiments, given in conjunction with the accompanying drawings, in which.

DETAILED DESCRIPTION

The advantages and features of embodiments and methods of accomplishing them will be clearly understood from the following description taken in conjunction with the accompanying drawings. However, the present disclosure is not limited to the embodiments described below, and may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
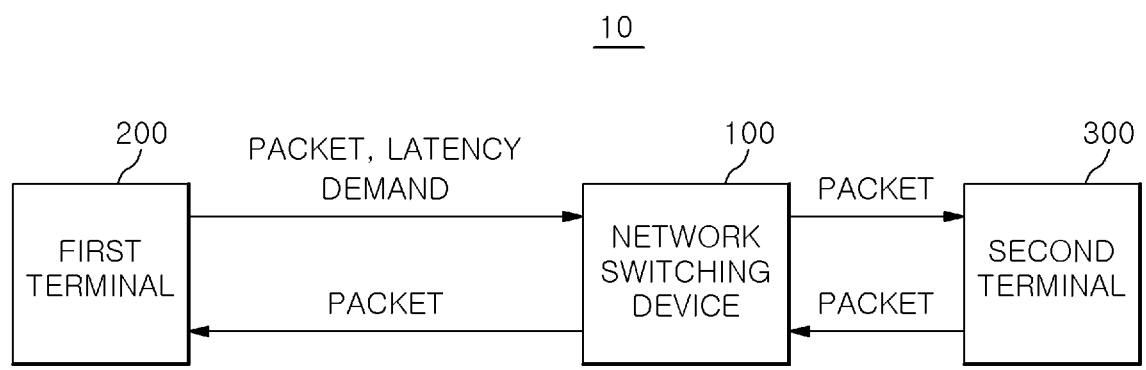
FIG. 1 shows a configuration of a system to which a network switching device according to an embodiment is applied.

FIG. 1 shows a configuration of a system 10 to which a network switching device 100 according to an embodiment is applied. Since the system 10 shown in FIG. 1 is merely an example, the network switching device 100 is not necessarily applied only to the system 10 shown in FIG. 1.

Referring to FIG. 1, the system 10 includes a first terminal 200, a second terminal 300, and a network switching device 100.

The first terminal 200 transmits and receives packets to and from the second terminal 300 through a network including the network switching device 100 according to the embodiment. If the first terminal 200 is a transmitter, the second terminal 300 is a receiver, or vice versa. The first terminal 200 and the second terminal 300 may be a personal computer (PC), a server, a smart device such as a smartphone or a smart pad, an IoT device, or the like, but are not limited thereto.

In a process of transmitting/receiving the packets, the network switching device 100 can insert (or perform) marking into (or on) some of the packets. For example, if the first terminal 200 transmits a packet to the second terminal 300, the first terminal 200 can receive a response packet from the second terminal 300 through the network switching device 100. Some of the packets received in this manner may contain marking inserted by the network switching device 100. Here, "marking" is an index inserted into a packet and indicates a congestion degree of the network where the packet is transmitted/received. The marking may also be referred to as "explicit congestion notification (ECN)."

The network switching device 100 can calculate a marking reference based on various information such as information on a network state or information on latency demand (shown in FIG. 1) received from a predetermined terminal, and then insert (perform) the marking into (or on) the packet based on the marking reference. The marking reference can be calculated by reflecting the change in the network state immediately. Therefore, in accordance with the network switching device 100 for performing marking based on the marking reference, it is possible to ensure low-latency guarantee or high resource utilization. The marking reference is calculated by reflecting the information such as latency (end-to-end round-trip time) demand received from a predetermined terminal. The latency demand is related to a target queue length. The current queue length of the network switching device 100 is within a predetermined range from the target queue length without exceeding the target queue length.

Here, the network switching device 100 can insert the marking on a flow basis. Here, the flow will be described with reference to FIG. 2.

Figure 2:
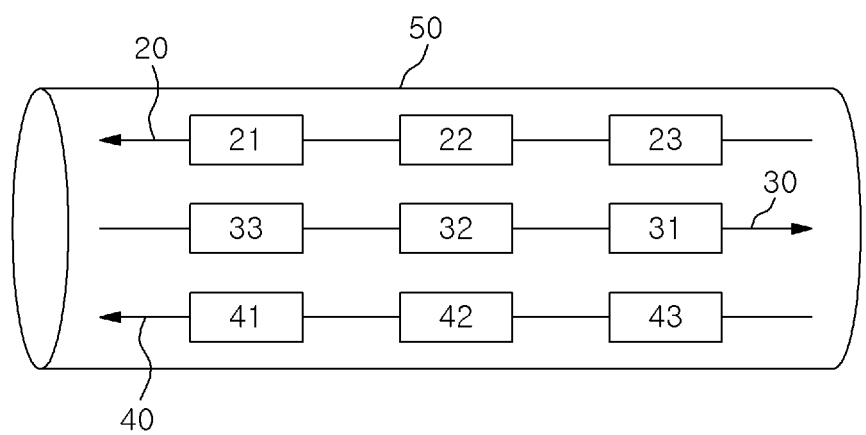
FIG. 2 is a conceptual diagram showing relationship of a session, flows, and packets.

FIG. 2 is a conceptual diagram showing relationship of a session 50, flows 20, 30, and 40, and packets 21 to 23, 31 to 33, and 41 to 43.

The session 50 is a service provided to any terminal. For example, if a video streaming service, a location information service, or a cloud service can be provided to a terminal device, each of the video streaming service, the location information service, and the cloud service is referred to as "session 50."

The flows 20, 30 and 40 are the flows of the packets forming the session 50. In other words, the session 50 includes at least one of the flows 20, 30 and 40. Each of the flows 20, 30 and 40 can be distinguished by an n-tuple such as a source IP, a destination IP, a source port, a destination port, or a protocol.

The packets 21 to 23, 31 to 33, and 41 to 43 are data units forming the flows 20, 30 and 40. In other words, each of the flows 20, 30 and 40 includes at least one of the packets 21 to 23, 31 to 33, or 41 to 43.

FIG. 2 shows three flows, for example. The network switching device 100 can insert the marking on a flow basis. For example, the network switching device 100 can insert a marking into at least a part of the packets 21, 22, and 23 included in the first flow 20 based on a predetermined marking reference. Further, the network switching device 100 can insert a marking into at least a part of the packets 31, 32, and 33 included in the second flow 30 based on the predetermined marking reference. This is also applied to the third flow 40.

Hereinafter, the network switching device 100 will be described in detail.

Figure 3:
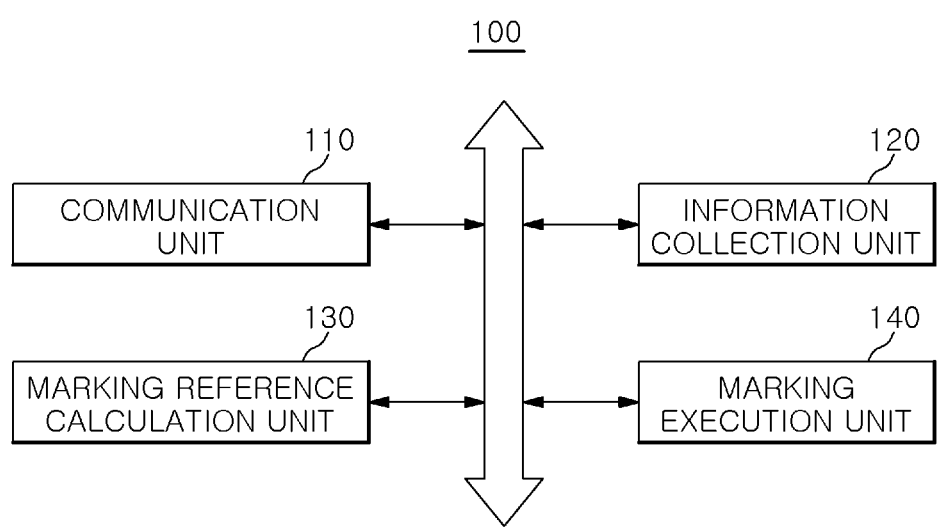
FIG. 3 shows a configuration of the network switching device according to the embodiment.

FIG. 3 shows a configuration of the network switching device 100 according to an embodiment. First, the network switching device 100 can be implemented by a hardware such as a server, a virtual network device (VNF), or the like.

Referring to FIG. 3, the network switching device 100 includes a communication unit 110, an information collection unit 120, a marking reference calculation unit 130, and a marking execution unit 140. Since, however, FIG. 3 shows merely an example, the configuration of the network switching device 100 is not limited to that shown in FIG. 3.

First, the communication unit 110 may be a wired or a wireless communication module for transmitting/receiving data. The network switching device 100 can communicate with various terminals 200 and 300 through the communication unit 110.

The information collection unit 120, the marking reference calculation unit 130, and the marking execution unit 140 can be implemented by a memory for storing instructions programmed to execute functions thereof and a microprocessor for executing the instructions.

The information collection unit 120 is configured to obtain various required information from the information received through the communication unit 110. The information obtained by the information collection unit 120 may include, e.g., information on the network state, information required to calculate the marking reference, a packet to be transmitted from one terminal to another terminal, and the like, but is not limited thereto.

The information on the network state may include, e.g., a start packet (SYN control packet) or an end packet (FIN control packet) of the flow.

The information required to calculate the marking reference may include at least one of, e.g., the latency demand required by the transmitter (the first terminal 200 or the second terminal 300 shown in FIG. 1) that tries to transmit a packet, a baseline end-to-end round-trip time (RTT), the number of flows transmitted through an output port of the communication unit 110, and a link capacity of the output port. The baseline end-to-end RTT indicates a minimum RTT of data packets that are not subjected to network queueing.

The information collection unit 120 can obtain "target queue length" from "latency demand" that is one of the information required to calculate the marking reference. As will be described later, the target queue length can be used to calculate the marking reference.

The marking reference calculation unit 130 newly calculates, i.e., updates, the marking reference whenever it is determined that the network state has changed. For example, when the start packet (SYN control packet) or the end packet (FIN control packet) of the flow is received through the communication unit 110, the marking reference calculation unit 130 can determine that the network state has changed and newly calculate the marking reference. However, when it is determined that the network state has not changed, the marking reference calculation unit 130 does not newly calculate the marking reference. In that case, the last marking reference calculated by the marking reference calculation unit 130 is maintained.

In other words, in accordance with the embodiment, the marking reference can be updated (calculated) adaptively and immediately by reflecting the change in the network state.

The marking reference calculation unit 130 calculates marking reference based on the information obtained by the information collection unit 120 among the information received through the communication unit 110. The information used for calculating the marking reference may include at least one of the latency demand required by the transmitter for transmitting a packet, the baseline end-to-end round-trip time (RTT), the number of flows transmitted through an output port of the communication unit 110, and the link capacity of the output port. The information collection unit 120 may consider the latency demand in the form of the target queue length at the time of calculating the marking reference. If the latency demand is changed, the target queue length obtained by the information collection unit 120 may be changed and, further, the marking reference may be changed.

Hereinafter, one of the specific methods for obtaining the target queue length will be described. Since, however, the method to be described below is merely an example, the scope of the present disclosure is not limited thereto. In other words, an embodiment in which the target queue length is obtained by various methods other than the following method can also be included in the scope of the present disclosure.

Such a method is based on a TCP fluid model. A target queue length $Q_{max}$ is calculated by the following Eq. (1).

$$Q_{max} = N * W_{max} - C * RTT_{min} \qquad \text{Eq. (1)}$$

Here, N indicates the number of flows transmitted through the output port of the communication unit 110. $W_{max}$ indicates a maximum window size of the transmitter for transmitting a packet through the network switching device 100. C indicates an allowable link capacity in a bottleneck. $RTT_{min}$ indicates a baseline end-to-end RTT.

The maximum window size $W_{max}$ of the transmitter is obtained using the Eq. (1), as in the following Eq. (2).

$$W_{max} = \frac{Q_{max} + C^* RTT_{min}}{N} \qquad \text{Eq. (2)}$$

The transmission amount of the transmitter is determined depending on types of transmission control protocols (TCP). TCP Reno that is an AIMD (addictive increase multiplicative decrease)-based control technique that is well-known in the field of networks and TCP Cubic that is currently used as default will be described as representative examples. The window sizes of the TCP Reno and the TCP Cubic are calculated by the following known equations.

$$W_{reno} = \frac{\hat{W}_{reno}}{2} + \frac{s}{\tau}, \qquad \text{Eq. (3)}$$

$$W_{cubic} = c \left( s - \sqrt[3]{\frac{\hat{W}_{cubic} b}{C}} \right)^3$$

$\hat{W}$ indicates a maximum window size that is a window size measured immediately before the transmitter detects congestion feedback (packet drop or congestion marking). In other words, $\hat{W}_{reno}$ indicates the maximum window size of TCP Reno, and $\hat{W}_{cubic}$ indicates the maximum window size of TCP Cubic. S indicates an elapsed time from the detection of the congestion feedback, and τ indicates an end-to-end RTT. b and c indicate parameters of TCP Cubic. TCP window function can express the maximum window size as packet loss probability p through fixed point analysis as in the following Eq. (4).

$$\hat{W}_{reno} = \sqrt{\frac{2}{p_{reno}}}, \; \hat{W}_{cubic} = \sqrt[4]{\frac{\tau^3 c}{p_{cubic}^3 b}} \qquad \text{Eq. (4)}$$

Here, $P_{reno}$ and $P_{cubic}$ indicate packet loss probability of TCP Reno and TCP Cubic, respectively.

If the TCP type of the transmitter and the maximum transmission amount $\hat{W}_{reno}$ or $\hat{W}_{cubic}$ for ensuring the target queue length $Q_{max}$ are given, the packet loss probability $P_{reno}$ or $P_{cube}$ at this time is obtained using the Eq. (4) as in the following Eq. (5).

$$p_{reno} = \frac{2}{\hat{W}_{reno}^2}, \quad p_{cubic} = \sqrt[3]{\frac{\tau^3 c}{\hat{W}_{cubic}^4 b}} \qquad \text{Eq. (5)}$$

The marking references R for maintaining the packet loss probability of Eq. (5) at a constant level are obtained by the following Eq. (6).

$$R_{reno} = p_{reno}, R_{cubic} = p_{cubic} \qquad \text{Eq. (6)}$$

Here, $R_{reno}$ indicates the marking reference for TCP Reno, and $R_{cube}$ indicates the marking reference for TCP Cubic.

The marking references applied to the flows may be different. For example, among the flows shown in FIG. 2, the marking reference applied to the first flow 20 may be different from the marking reference applied to the second flow 30 or the third flow 40. This is because at least a part of the above-described information used for calculating the marking reference may be different for each flow. The flows shown in FIG. 2 will be described as an example. The baseline end-to-end RTT is one of the information used for calculating the marking reference. The RTT value of the first flow 20, the RTT value of the second flow 30, and the RTT value of the third flow 40 may be different. Therefore, the marking reference for the first flow 20 calculated based on the information including the RTT value may be different from the marking reference for the second flow 30 or the third flow 40. Similarly, the link capacity is one of the information used for calculating the marking reference. When the first flow 20, the second flow 30 and the third flow 40 are transmitted through different output ports, the link capacites of the different output ports may be different. Therefore, the marking reference for the first flow 20 calculated based on the information including the link capacity may be different from the marking reference for the second flow 30 or the third flow 40.

The marking execution unit 140 can insert the marking into at least a part of the packets received through the communication unit 110 based on the marking reference calculated by the marking reference calculation unit 130.

Hereinafter, an example in which the marking execution until 140 inserts the marking into the packet based on the marking reference will be described. If the marking reference is based on the number of packets, the marking reference in that case may be referred to as "marking rate." For example, it is assumed that the marking rate is ⅓. This indicates that when three packets are received, the marking is inserted into one of the packets, e.g., the last received packet. The marking execution unit 140 counts the number of packets received through the communication unit 110 based on the marking rate. When the number of received packets is three or more, the marking execution unit 140 performs the marking only on the last received packet. Then, the marking execution unit 140 resets the counted number and counts again the number of packets received through the communication unit 110. At this time, the marking execution unit 140 can perform the marking such that the distance between packets into which the marking is inserted becomes the same or the number of packets between the packets into which the marking is inserted becomes the same.

Figure 4:
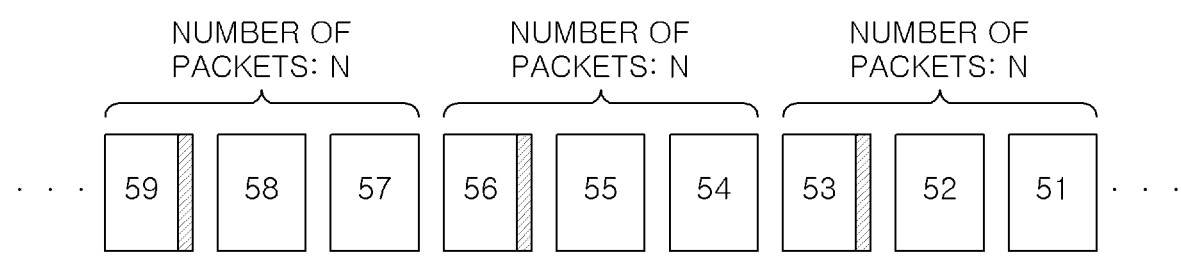
FIG. 4 shows an example in which marking is inserted into some of the packets.

FIG. 4 shows an example in which the marking is inserted based on the marking rate. Referring to FIG. 4, the marking (indicated by shading) is inserted into the last received packet 53 among the packets 51 to 53; the marking is inserted into the last received packet 56 among the packets 54 to 56; and the marking is inserted into the last received packet 59 among the packets 57 to 59.

When the marking reference is updated, the marking execution unit 140 can insert the marking based on the updated marking reference. For example, if it is determined that the network state has changed, the marking reference calculation unit 130 can update the marking reference and insert the marking based on the updated marking reference. On the other hand, if it is determined that the network state has not changed, the marking reference is not updated and maintained as the last value calculated by the marking reference calculation unit 130. Therefore, the marking execution unit 140 can insert the marking based on the marking reference maintained as the last calculated value.

As described above, in accordance with the embodiment, it is possible to calculate the marking reference by immediately reflecting the information on the network state and the information such as the latency demand received from a terminal. Therefore, in accordance with the embodiment, the marking can be performed based on a calculated marking reference, which makes it possible to ensure low-latency guarantee or high resource utilization.

Figure 5:
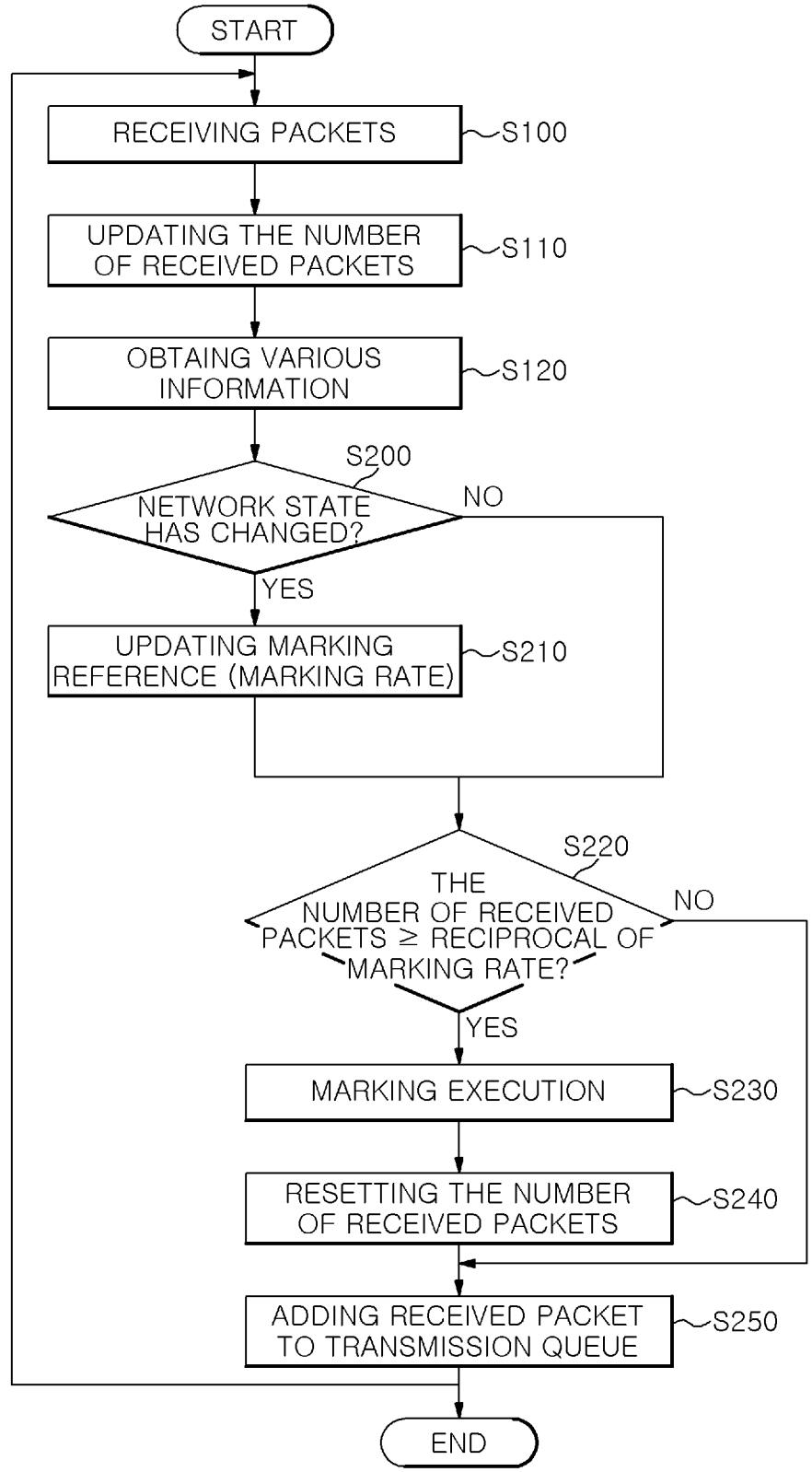
FIG. 5 shows a procedure of a method for performing marking according to an embodiment.

FIG. 5 shows an example of a procedure of a method for performing marking according to one embodiment. The method for performing marking shown in FIG. 5 can be performed by the network switching device 100 shown in FIG. 3. Since the procedure of the method shown in FIG. 5 is merely an example, the procedure of the method for performing marking is not limited to that shown in FIG. 5.

Referring to FIG. 5, the network switching device 100 receives multiple packets from a terminal through the communication unit 110 (S100). The terminal may be the first terminal 200 or the second terminal 300 shown in FIG. 1, but is not limited thereto.

The marking execution unit 140 of the network switching device 100 calculates (updates) the number of received packets including the packet received in the step S100 (S110).

The information collection unit 120 of the network switching device 100 obtains various required information from the information received through the communication unit 110 (S120). The obtained information may include, e.g., information on the network state, information required to calculate the marking reference, a packet to be transmitted from one terminal to another terminal, and the like, but is not limited thereto. Among them, the information on the network state may include, e.g., a start packet (SYN control packet) or an end packet (FIN control packet) of the flow. The information required to calculate the marking reference may include at least one of the latency demand required by the transmitter for transmitting a packet, the baseline end-to-end RTT, the number of flows transmitted through the output port of the communication unit 110, and the link capacity of the output port. Here, the "latency demand" can be used to obtain the "target queue length" as described above.

The marking reference calculation unit 130 of the network switching device 100 determines whether or not the network state has changed (S200). For example, if the start packet (SYN control packet) or the end packet (FIN control packet) of the flow is received through the communication unit 110, the marking reference calculation unit 130 can determine that the network state has changed.

If it is determined that the network state has not changed, the marking reference calculation unit 130 does not newly calculate the marking reference. Therefore, in that case, the marking reference is maintained as the last value calculated by the marking reference calculation unit 130.

On the other hand, if it is determined that the network state has changed, the marking reference calculation unit 130 can newly calculate, i.e., update, the marking reference (S210). The information used for calculating the marking reference may include at least one of the latency demand required by the transmitter for transmitting the packet, the baseline end-to-end RTT, and the number of flows transmitted through the output port of the communication unit 110, and the link capacity of the output port. The information collection unit 120 can consider the latency demand in the form of the target queue length in calculating the marking reference as described above. If the latency demand is changed, the target queue length obtained by the information collection unit 120 may be changed and, further, the marking reference may be changed. Since the specific method for calculating the marking reference has been described above, the description thereof will be omitted.

The marking execution unit 140 of the network switching device 100 compares the marking reference and the number of received packets updated in the step S110 (S220). In FIG. 5, the marking reference is indicated as the marking rate based on the number of packets.

If it is determined in the step S220 that the number of received packets is smaller than the reciprocal of the marking rate, the packet received in the step S100 is added to the transmission queue of the communication unit 110 (S250), and the process returns to the step S100.

On the other hand, if it is determined in the step S220 that the number of received packets is greater than or equal to the reciprocal of the marking rate, the marking execution unit 140 inserts the marking into a part of the packets (S230). For example, on the assumption that the marking rate is ⅓, when the number of received packets is 3, the marking is inserted into the first received packet (S230). Then, the number of received packets is reset (S240), and the third received packet in the step S100 is added to the transmission queue.

As described above, in accordance with the embodiment, it is possible to calculate the marking reference by immediately reflecting the information on the network state or the information such as the latency demand received from a terminal. Therefore, in accordance with the embodiment, the marking can be performed based on the calculated marking reference, which makes it possible to ensure low-latency guarantee or high resource utilization.

The above-described embodiments of the present disclosure can be embodied in the form of a computer-readable storage medium storing computer programs for executing the steps of the method or in the form of the computes programs stored in the computer-readable storage medium to execute the steps of the method.

The above description is merely exemplary description of the technical scope of the present disclosure, and it will be understood by those skilled in the art that various changes and modifications can be made without departing from the characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

This work was supported by Institute of Information & communications Technology Planning & Evaluation (IITP) grant funded by the Korea government, and the research project is "UDP-based Ultra Low-Latency Transport Protocol with Mobility Support" (2017.04.01-2020.12.31).

What is claimed is:

1. A network switching device to be connected to a network, comprising:
    a communication unit;
    an information collection unit configured to obtain information on a network state of the network from first and second information for packets received through the communication unit;
    a marking reference calculation unit configured to calculate a marking reference based on the second information when it is determined that the network state has changed based on the first information; and
    a marking execution unit configured to perform marking indicating a congestion degree of the network on at least a part of the packets received through the communication unit based on the calculated marking reference,
    wherein the marking reference calculation unit determines that the network state has changed when the first information represents that a start packet or an end packet of a flow is included in the packets,
    the marking reference calculation unit keeps updating the marking reference based on the second information whenever the network state has changed, such that the marking reference is updated adaptively by reflecting the congestion degree of the network,
    the marking execution unit counts the number of packets received through the communication unit, performs the marking on one of the counted packets when the counted number of packets is greater than or equal to the number of packets defined by the marking reference, and resets the counted number of packets, and
    the marking execution unit performs the marking such that each distance between two adjacent packets on which the marking is performed becomes identical.

2. The network switching device of claim 1, wherein the second information includes at least one of latency demand required by a transmitter for transmitting a packet, baseline end-to-end round-trip time (RTT), the number of flows transmitted through an output port of the communication unit, and a link capacity of the output port.

3. The network switching device of claim 2, wherein the information collection unit obtains a target queue length of the communication unit from the latency demand, and
    the marking reference calculation unit calculates the marking reference based on the obtained target queue length as well as the second information received through the communication unit.

4. The network switching device of claim 3, wherein the marking reference calculation unit calculates the marking reference such that a current queue length of the communication unit remains within a predetermined range from the obtained target queue length and without exceeding the obtained target queue length.

5. The network switching device of claim 3, wherein the target queue length is determined based on predetermined factors comprising the number of flows transmitted through the output port of the communication unit, and the link capacity of the output port, a maximum window size of the transmitter for transmitting the packet and the baseline end-to-end RTT.

6. The network switching device of claim 1, wherein the marking reference calculation unit calculates the marking reference using a TCP fluid model.

7. The network switching device of claim 1, wherein the marking execution unit performs the marking on a flow basis.

8. The network switching device of claim 7, wherein marking references applied to respective flows have different values.

9. A method for performing marking using a network switching device to be connected to a network, the method comprising:

obtaining information on a network state of the network from first information for packets received by the network switching device;

determining whether or not the network state has changed based on the obtained information;

calculating a marking reference based on second information for the packets when it is determined that the network state has changed; and allowing the network switching device to perform marking indicating a congestion degree of the network on at least a part of the packets based on the calculated marking reference, wherein the network state is determined as being changed when the first information represents that a start packet or an end packet of a flow is included in the packets, the marking reference keeps being updated based on the second information whenever the network state has changed, such that the marking reference is updated adaptively by reflecting the congestion degree of the network, the number of packets received through the communication unit is counted, the marking on one of the counted packets is performed when the counted number of packets is greater than or equal to the number of packets defined by the marking reference, and the counted number of packets is reset after the marking, and each distance between two adjacent packets on which the marking is performed becomes identical.

10. A non-transitory computer-readable storage medium including executable instructions, wherein the instructions, when executed by a processor, cause the processor to perform a method for performing marking using a network switching device, the method comprising:

obtaining information on a network state of the network from first information for packets received by the network switching device;

determining whether or not the network state has changed based on the obtained information;

calculating a marking reference based on second information for the packets when it is determined that the network state has changed; and allowing the network switching device to perform marking indicating a congestion degree of the network on at least a part of the packets based on the calculated marking reference, wherein the network state is determined as being changed when the first information represents that a start packet or an end packet of a flow is included in the packets, the marking reference keeps being updated based on the second information whenever the network state has changed, such that the marking reference is updated adaptively by reflecting the congestion degree of the network, the number of packets received through the communication unit is counted, the marking on one of the counted packets is performed when the counted number of packets is greater than or equal to the number of packets defined by the marking reference, and the counted number of packets is reset after the marking, and each distance between two adjacent packets on which the marking is performed becomes identical.

* * * * *